United States Patent
Tamás et al.

[11] 4,006,265
[45] Feb. 1, 1977

[54] PROCESS FOR DETOXIFYING CROPS, PARTICULARLY CORN, INFECTED BY FUSARIUM

[75] Inventors: Károly Tamás, Kalocsa; László Wöller, Budapest, both of Hungary

[73] Assignee: Mezogazdasagi Foiskola, Kaposvar, Hungary

[22] Filed: Apr. 9, 1974

[21] Appl. No.: 459,377

[30] Foreign Application Priority Data
Apr. 26, 1973  Hungary .................. ME 1622

[52] U.S. Cl. .............. 426/623; 424/130; 424/166; 426/626; 426/807

[51] Int. Cl.² ............. A01N 11/00; A01N 17/00; A01N 23/00

[58] Field of Search ......... 426/321, 322, 335, 373, 426/302, 320, 630, 807, 532, 635, 623, 626; 424/130, 131, 166

[56] References Cited
UNITED STATES PATENTS

| | | | |
|---|---|---|---|
| 2,916,405 | 12/1959 | Evans et al. | 426/335 X |
| 3,429,709 | 2/1969 | Masri et al. | 426/335 X |
| 3,506,458 | 4/1970 | Martin | 426/335 X |
| 3,607,313 | 9/1971 | Roth | 426/302 |
| 3,890,452 | 6/1975 | Brandt et al. | 426/321 |

FOREIGN PATENTS OR APPLICATIONS 1,112,471  12/1955  Germany .............. 426/335

OTHER PUBLICATIONS

Chem. Abstracts 32:5144–5148 Hydrogen Peroxide for Seed Treatment – 1937.
Chem. Abstracts 72:2930b, Effect of Chemical Elements on the Growth of Crop Pathogens – 1964.
Chem. Abstracts 51:148m, Diseases of Corn and Their Control in the Estonian S.S.R. – 1966.
"The Merck Index," 8th edition, Stecher–editor, pub. by Merck Pub. Co., 1968, p. 1126.
Abstract, 74:86526p, 1971.

Primary Examiner—Frank W. Lutter
Assistant Examiner—N. Greenblum
Attorney, Agent, or Firm—Young & Thompson

[57] ABSTRACT

Corn infected by Fusarium is detoxified by spraying the same with a 2 to 10%, preferably 3 to 6%, aqueous solution of hydrogen peroxide and/or ammonium hydroxide, followed by heat drying.

2 Claims, 1 Drawing Figure

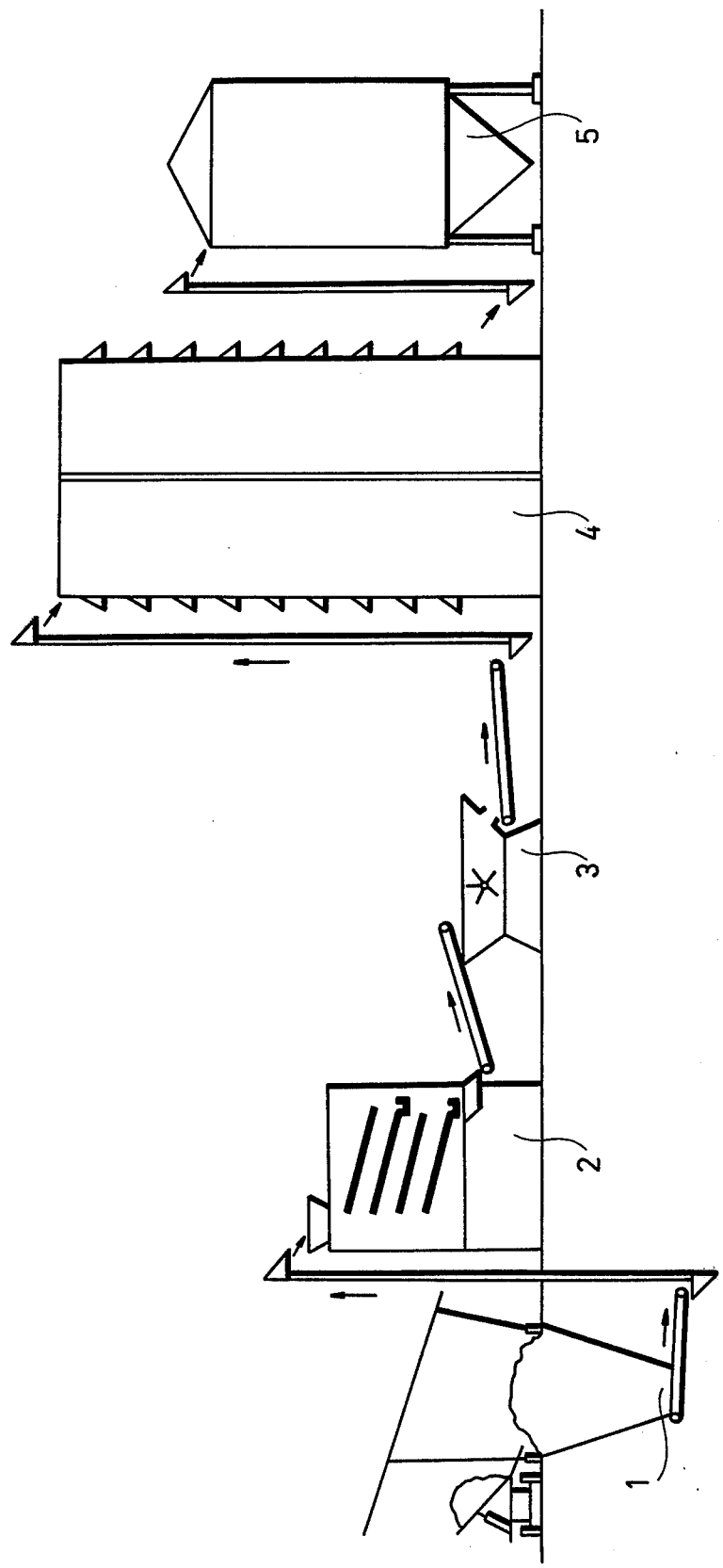

PROCESS FOR DETOXIFYING CROPS, PARTICULARLY CORN, INFECTED BY FUSARIUM

The present invention relates to detoxifying several crops, particularly corn, infected by Fusarium.

It is known that some Fusarium strains or varieties cause not only provable losses in the field of plant cultivation, but they result in heavy disadvantages and losses in livestock and animal husbandry.

The disadvantages mentioned above are particularly significant with regard to corn, considering that corn is used in great amounts for feeding animals, mainly pigs.

It has been demonstrated that hormonal disorders arise in animals, fed with corn infected by Fusarium appearing as false rutting and jumping, among others. Another pernicious consequence of feeding with corn infected by Fusarium is the decrease of the progeny, the postponement of the effectual insemination. Another disadvantage caused by corn infected with Fusarium is the decrease in the number of periods of parturitions which results in upsetting of the reproductive cycle, as a consequence of which the amount of amortization and costs calculated on the end product will increase. Also the disadvantage is to be noted that the corn infected with Fusarium causes a lack of appetite and the animals do not gain weight, moreover, in some cases they lose weight. According to experiments appetite can be increased by adding a flavouring agent to the feed, but parallel with this addition also toxicosis increases. In addition to the disadvantages mentioned above in the case of feed infected with Fusarium a decrease in the utilization of the feed consumed by the animals can be unambiguously ascertained.

During experiments aimed at the clarification of the disadvantageous effects caused by the Fusarium strains it was established that the diseases and pernicious changes of the animals fed with feed infected by Fusarium took place as a result of toxins produced by the Fusarium fungi. It was also ascertained that the Fusarium graminearum strain connected with corn produces toxins designated F-1, F-2, and F-3. It can be shown that toxin F-1 is identical with ergosterine. In chemical terminology, the toxin F-2 designated recently as zearalenone, had the name of 6-/10-hydroxy-6-oxo-trans-1-undecyl/-$\beta$-resorcylic acid. The toxin F-3 has not been determined yet.

It was also ascertained during the experiments that in the toxicity of the corn infected by Fusarium the toxin F-2 plays the decisive role. Moreover, it was also established that some other Fusarium strains, e.g. Fusarium roseum, Fusarium culmorum, having no occurrence in corn, also produce zearalenone. With the knowledge of the facts as mentioned above, the object of the invention is the chemical suppression of the toxin F-2 the more so as the toxin F-2 is also produced by some Fusarium strains in different kinds of plants.

According to the process of the present invention the feed infected by Fusarium is treated with a water solution of an oxidizing agent, and then dried by heat. The double bonds and oxo groups present in the toxin F-2 are oxidized by the nascent oxygen liberated from the oxidizing agent, the oxygen not bound is exhausted, and the remaining water is removed by drying.

As an oxidizing agent theoretically any kind of oxygen releasing agents can be employed, but taking into account economic and other factors, the use of hydrogen peroxide is preferred. The concentration of the oxidizing agent in the water solution is 2 to 10 percent, preferably 3 to 6 percent. It was found, that a water solution of a basic agent also can be used for detoxifying. As such a basic agent ammonium hydroxide can be particularly suggested, but e.g. also hydrazine and hydroxylamine can be used. The concentration of the basic agent employed for the detoxification in the water is 2 to 10 percent, preferably 3 to 6 percent.

Upon treating with ammonium hydroxide, condensation reactions take place between the toxin F-2 and the ammonium hydroxide, which have not been clarified exactly yet. But it was experimentally proved that the toxin F-2 was transformed as a result of the condensation reactions, and deprived of its biological activity and thus its harmful effect on animal health was countered. The excess ammonia and the remaining water are removed by drying.

The detoxification process according to the present invention can also be performed with good results, if the crop infected by Fusarium is treated with both a water solution of an oxidizing agent and the water solution of the basic agent, followed by heat drying. According to a preferred embodiment of the invention it is expedient to perform the treatment as a spray steeping.

Accordingly the gist of the present invention lies in steeping the crop with a water solution of an oxidizing agent, preferably hydrogen peroxide and/or a water solution of a basic agent preferably ammonium hydroxide, followed by heat drying.

The process of the present invention will be described in detail in the following examples:

EXAMPLE 1

Corn, badly infected by Fusarium, and containing toxin F-2 was sprayed with a 3 percent water solution of hydrogen peroxide. For 100 kg of corn 10 liters of solution were used. After the spray steeping the corn was dried to a 90 percent solids content.

After having carried out the process the treated corn showed a negative test as to F-2 content.

EXAMPLE 2

The crop infected by Fusarium, the same as used in Example 1, was sprayed with a 6 percent water solution of hydrogen peroxide followed by drying to a 90 percent solids content. In this case also 10 liters of solution were used for 100 kg of corn. After the process the corn was negative as to its F-2 content.

EXAMPLE 3

The same corn as used in Example 1, infected by Fusarium was treated with a 6 percent water solution of ammonium hydroxide. The treatment was also performed as a spray steeping, and for 100 kg corn 10 kg solution was kg corn 10 kg solution The drying was carried out as in the preceeding Examples.

After the process the corn was negative as to F-2 content. Traces of ammonia could not be detected.

Pigs and rats were fed with the corn treated by the processes described in the Examples, and no toxic effects were discovered in these animals.

A particular advantage of the present invention in addition to the result of the detoxication is that it can simply be adapted to the technological process employed in large-scale agricultural production. Thus the detoxification can be employed before storing on the farm which produces the crop, without any change in the apparatus previously used. The adaptation of the process according to the present invention to the known technological process will be now described in conformity with the apparatus shown on the drawing. The apparatus provides a solution generally used or which can be used, but any modification of the solution represented on the drawing does not affect the successful carrying out of the process according to the present invention.

The conveyors transporting the crops from the field generally discharge them into the receiving chute 1, from which it is passed to the grain-cleaner 2 generally by means of a bucket conveyor. The detoxifying equipment 3, which can be a wet seed dresser or a sprayer chemical-batcher, follows the grain-cleaner 2. This detoxifying equipment applies the solution(s) mentioned above to the crop uniformly and in the desired amount. Then the crop treated with chemicals enters the dryer, represented in the drawing as a drying column 4. The drying equipment is important to detoxification, as the detoxification process is completed by heat during drying. The dried crop can be transported directly to the place of consumption or can be collected in the storing silo 5.

We claim:

1. A process for detoxifying corn used for animal feeding, said corn being infected by Fusarium, comprising the steps of steeping the corn with a member selected from the group consisting of a 3 to 6% aqueous solution of hydrogen peroxide and a 6% aqueous solution of ammonium hydroxide, and then heat drying the corn.

2. A process as claimed in claim 1, and applying said solution to said corn by spraying.

* * * * *